United States Patent [19]
Spirk

[11] 3,935,490
[45] Jan. 27, 1976

[54] SUPPORTING ARRANGEMENT FOR THE ROTOR OF A VERTICAL ELECTRIC MACHINE SUCH AS HYDRAULIC GENERATOR OR THE LIKE

[75] Inventor: Franz Spirk, Berlin, Germany

[73] Assignee: Siemens Aktiengesellschaft, Munich, Germany

[22] Filed: Jan. 10, 1975

[21] Appl. No.: 539,956

[30] Foreign Application Priority Data
Mar. 1, 1974  Germany............................ 2410437

[52] U.S. Cl. ..................... 310/91; 310/90; 310/157
[51] Int. Cl.² ........................................ H02K 5/24
[58] Field of Search ........... 310/87, 89, 90, 91, 261, 310/268, 259, 157

[56] References Cited
UNITED STATES PATENTS

| | | | |
|---|---|---|---|
| 3,023,329 | 2/1962 | Kamphaus et al. ................... | 310/91 |
| 3,343,016 | 9/1967 | Lewis ............................. | 310/91 X |
| 3,387,152 | 6/1968 | Mücke ............................. | 310/157 X |
| 3,803,434 | 4/1974 | Tamatsukuri ...................... | 310/90 X |

FOREIGN PATENTS OR APPLICATIONS

| | | | |
|---|---|---|---|
| 525,614 | 5/1955 | Italy ............................. | 310/157 |
| 1,195,401 | 6/1968 | Germany .......................... | 310/91 |

*Primary Examiner*—Donovan F. Duggan
*Attorney, Agent, or Firm*—Kenyon & Kenyon Reilly Carr & Chapin

[57] ABSTRACT

The support arrangement for a vertical electric machine includes a support spider thereof having arms fastened in a concrete wall surrounding the machine. The arms are secured only in the tangential direction. For this purpose, the arms extend into cavities of metal elements set into the concrete wall and are secured therein in the tangential direction by pretensioned rolling members. Because of the rolling motion of the rolling members, radial thermal expansion causes only relatively small radial forces to act and be transmitted to the concrete wall.

7 Claims, 5 Drawing Figures

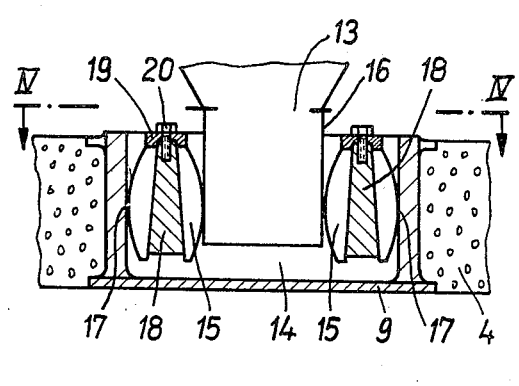
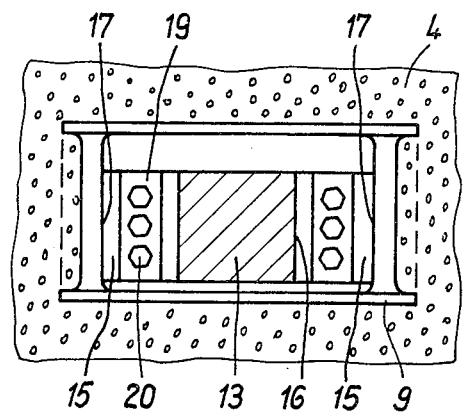
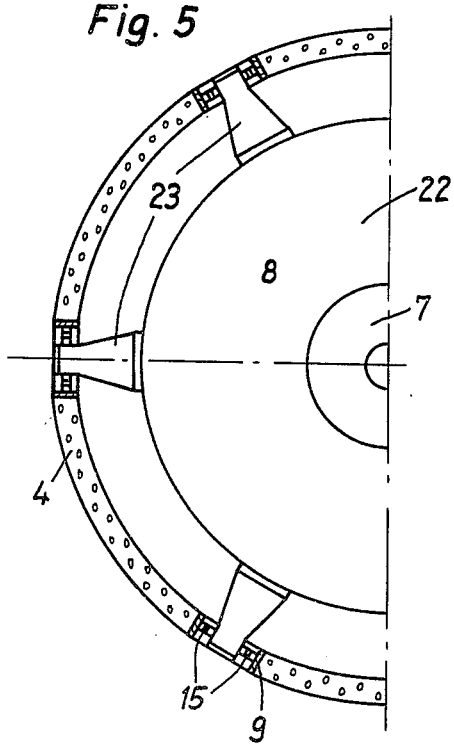

SUPPORTING ARRANGEMENT FOR THE ROTOR OF A VERTICAL ELECTRIC MACHINE SUCH AS HYDRAULIC GENERATOR OR THE LIKE

BACKGROUND OF THE INVENTION

The invention relates to a vertical electric machine such as a hydraulic generator or the like wherein the radial guide bearings for the rotor are disposed in support spiders which are arranged above and/or below the machine and are fastened in turn in the concrete wall surrounding the machine or in the concrete foundation by means of metal elements set therein.

Such hydraulic generators have a vertical shaft and an upper support spider wherein the guide bearing is arranged. It is known to connect the support spider with the concrete wall surrounding the machine in order to achieve quieter running. For this purpose, the arms are extended up to the concrete wall and bolted there rigidly to a metal element such as a base plate set in the concrete wall. This known arrangement has the advantage that the stiffness of the support spider with respect to flexural resonance frequencies is determined by the stiffness of the arms which are stressed in compression in the longitudinal direction. However, there results the disadvantage that very large compression forces occur in the event of thermal expansion of the arms of the support spider; these forces act in the radial direction and are transmitted to the concrete wall. The concrete wall, however, is often not capable of taking up large radial forces, particularly, if the support spider is arranged above the machine.

Accordingly, it is an object of the invention to provide a support arrangement for an electric machine of the above-mentioned type wherein the arms of the support spider for the radial guide bearings are supported in the concrete wall surrounding the machine in such a manner that the forces produced by the thermal expansion of the support spider can be taken up without difficulty and without affecting the quiet running of the machine.

SUMMARY OF THE INVENTION

The above object is realized by the support arrangement according to the invention which is suitable for a vertical electric machine such as a hydraulic generator or the like wherein the radial guide bearings for the rotor are disposed in support spiders which are arranged above and/or below the machine.

It is a feature of the invention to fasten the support spider in the concrete wall surrounding the machine by means of metal elements set therein. The arms of the support spider or spiders are, according to the invention, stiffened with respect to each other and extend into corresponding cavities defined by the metal elements. The arms are secured there only in the tangential direction taken relative to the stator of the machine by means of adjustably pretensioned rolling elements. The holding of the arms in the concrete wall is therefore undertaken in a manner so that the forces resulting from the eccentricity of the rotor due to manufacturing tolerances or one-sided magnetic pull are introduced into the concrete wall in a purely tangential direction.

The supporting arrangement of the invention advantageously utilizes the fact that these concrete walls normally can take up larger forces in the tangential direction than in the radial direction. Since the individual arms of the support spider are stiffened against each other, the flexural stress of the arms, as takes place in the support arrangement according to the invention, is kept sufficiently low to ensure quiet running. Furthermore, since pretensioned rolling elements are used for holding the arms in the metal elements, a rolling motion of the rolling elements is produced in case of expansion of the arms due to a temperature rise in the radial direction, so that only small radial forces that occur from the rolling friction of the rolling elements subjected to the pretension need to be transmitted to the concrete wall in the radial direction.

It is advantageous to configure the metal elements so that they define a U-profile which encloses the arms and at whose opposite side walls the rolling elements rest. The pretension forces of these rolling elements are thereby intercepted within the metal element and do not stress the concrete. The metal elements may also be configured as an open box.

Sufficient flexural stiffness of the support spider is achieved by connecting the respective arms with each other by stiff beams as close as possible to their fastening point in the surrounding concrete wall. However, it is also possible to construct the support spider as an inherently stiff disc, at whose circumference only arm stubs are arranged. The arm stubs are then secured in the tangential direction in the concrete wall by means of the pretensioned rolling elements.

Although the invention is illustrated and described herein as a supporting arrangement for the rotor of a vertical electric machine such as a hydraulic generator or the like, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 3 is an exploded view showing how the arms of the support spider are held in the concrete structure arranged in surrounding relation to the machine.

FIG. 4 is a section view taken along lines IV-IV of FIG. 3 to illustrate structural details of the cavity defined by the metal elements set into the concrete structure.

FIG. 5 is a plan view showing how the support spider can be configured according to an alternate embodiment of the invention. In this view the support spider is constructed as an inflexible disc with stub-like arms extending from the circumference thereof.

DESCRIPTION OF THE PREFERRED EMBODIMENTS OF THE INVENTION

Figure 1:
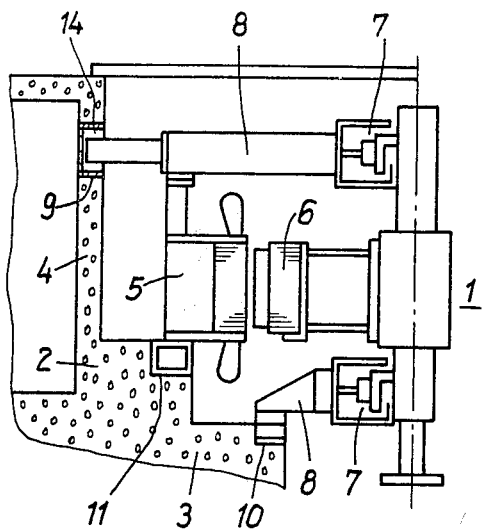
FIG. 1 is an elevation schematic diagram showing a longitudinal section taken through a vertical electric machine equipped with the supporting arrangement according to the invention.

The vertical electric hydraulic generator 1 is disposed in a concrete wall 2 which consists in the area of the electric machine essentially of the concrete foundation 3 and a concrete wall 4 surrounding the stator 5 of the hydraulic generator 1 with spacing. The rotor 6 of the hydraulic generator 1 is held above and below the machine in radial guide bearings 7, of which one may also be combined, in a manner not shown, with a support bearing. The radial bearings 7 are each located in a support spider 8, of which the upper one is fastened in the concrete wall 4 by means of metal elements 9 and the lower one in the concrete foundation 3 by means of a foundation plate 10. The stator 5 of the electric machine is likewise supported in the concrete foundation 3 via a further foundation plate 11.

As the concrete foundation 3 is of very massive construction, it presents no problem to also transmit through the foundation plates 10 and 11 radially directed forces to the concrete, such as occur, for instance, in case of thermal expansion of the electric machine. The concrete wall 4, on the other hand, is relatively thin, so that the upper support spider 8 can be fastened according to the invention to prevent the concrete wall 4 from being stressed by excessive forces acting in the radial direction.

The individual arms 13 of the upper support spider 8 are extended so far that they project into a cavity 14 formed by the metal elements 9 set in the concrete wall 4. The metal elements 9 therefore have the form of a box which is open on the inner side of the concrete wall 4. Pretensioned roller bearing means in the form of pretensioned rolling elements 15 serve to secure the arms 13 in the metal elements 9. The arms 13 have side walls 16 which are opposite each other transversely to the direction of the circumference of the concrete wall 4. The rolling elements 15 are arranged between the side walls 16 and the side walls 17 of the metal elements 9 in such a manner that they fix the arms 13 only in the tangential direction without play. For this purpose, the rolling elements 15 are given, by means of wedges 18, a certain amount of pretension which is sufficient to establish a positive force-transmitting connection between the side walls 17 of the metal elements 9 and the arms 13 of the support spider 8 in the tangential direction taken with respect to the stator 5 of the machine. The wedges 18 are disposed in the interior of the rolling elements 15 and are secured in the position required for the desired pretension in plates 19 by screws 20, the plates 19 lying laterally against the rolling elements 15.

The curvature of the rolling elements 15 may be chosen spherical or also cylindrical. In the latter case the cylindrical rolling elements 15 are arranged so that their axis of rotation is vertical and parallel to the side walls 16 of the arms 13 against which the rolling elements 15 rest.

The fastening of the arms 13 of the support spider 8 in accordance with the invention is achieved by means of the pretensioned rolling elements 15 in the metal elements 9 configured as boxes and functions as described below.

The forces due to eccentricity of the rotor 6, which forces normally occur during the operation of the electric hydraulic generator 1, are introduced into the concrete wall 4 through the pretensioned rolling elements 15 only in the tangential direction. As a concrete wall is very resistant to tangentially directed forces, a relatively thin concrete wall 4 is already capable of taking up larger eccentricity forces of the rotor 6. With this kind of fastening, however, the arms 13 are stressed flexurally. For this reason, the arms 13 of the support spider 8 are connected with each other by stiff beams 21 which increase the bending stiffness of the support spider 8.

If, because of a temperature rise, thermal expansion of the arms 13 of the support spider 8 now occurs, this has the effect of displacing the arms 13 in the radial direction. This displacement causes a rolling motion of the roller bearings 15 at the side walls 16. Only relatively small radial forces are produced thereby which result from the rolling friction of the rolling elements 15 under pretension, and which are likewise transmitted to the concrete wall 4 through the metal elements 9. However, the size of these radially directed forces is so small that they can be taken up without difficulty even by a relatively thin concrete wall 4.

In this manner there is therefore obtained an essentially tangentially directed stress of the concrete wall 4. Because of the box-like shape of the metal elements 9, the latter form a U-profile enclosing the arms 13 and include opposite side walls 17 against which the rolling elements 15 rest. The metal elements 9 are therefore capable of taking up the pretension forces due to the wedged rolling elements 15 themselves so that they do not additionally stress the concrete wall.

Figure 2:
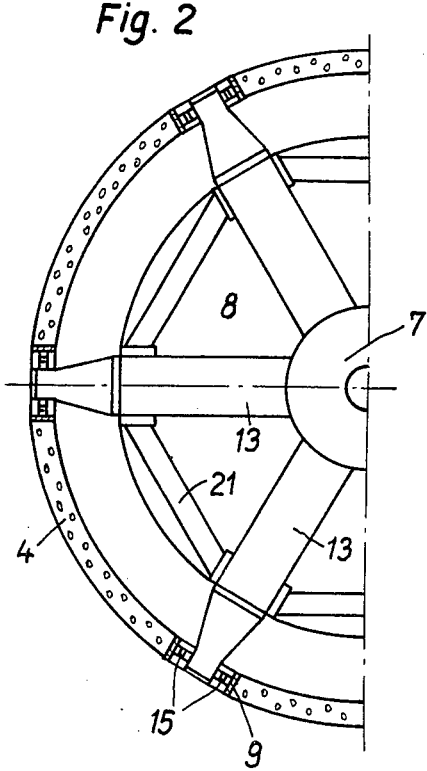
FIG. 2 is a plan view of the upper support spider of the machine shown in FIG. 1.

The concrete wall 4 need not be constructed in ring-fashion as shown in FIG. 2, but may also be constructed in the shape of a polygon or a square, according to the number of the existing arms 13 of the upper support spider 8.

FIG. 5 shows schematically a modified form of the upper support spider 8. So that the support spider is as flexurally stiffened as possible, it consists essentially of an inherently inflexible disc 22, which carries in the center the guide bearing 7. At the circumference of the disc 22 are arranged at regular spacings arm stubs 23 which protrude into the cavities 14 of the metal elements 9 set in the concrete wall 4 and are secured therein in the tangential direction by means of the pretensioned rolling elements 15.

What is claimed is:

1. A supporting arrangement for the rotor of a vertical electric machine such as a hydraulic generator or the like comprising: at least one support spider equipped with a guide bearing for radially guiding the rotor and having a plurality of arms extending therefrom; a concrete support structure arranged in surrounding relation to the rotor; metal elements set into said concrete structure so as to define a plurality of cavities for receiving corresponding ones of said arms therein; and, adjustably pretensioned roller bearing means arranged at said cavities for holding said arms only in a tangential direction viewed relative to the stator of the electric machine.

2. The supporting arrangement of claim 1 comprising stiffening means for mutually stiffening said arms.

3. The supporting arrangement of claim 2, said metal elements defining a plurality of U-shaped elements surrounding corresponding ones of said arms and defining mutually adjacent side walls for contacting said bearing means.

4. The supporting arrangement of claim 2, said roller bearing means being a plurality of pairs of bearings arranged at corresponding ones of said cavities, each of the bearings of each of said pairs having a spherical curvature.

5. The supporting arrangement of claim 2, said bearing means being a plurality of pairs of bearings disposed at corresponding ones of said cavities, each of the bearings of each of said pairs being pretensioned by means of a wedge arranged therein.

6. The supporting arrangement of claim 2, said roller bearing means being a plurality of pairs of bearings arranged at corresponding ones of said cavities, each of the bearings of each of said pairs having a cylindrical curvature.

7. The supporting arrangement of claim 1, said support spider being configured as an inflexible disc having a plurality of arm-like stubs extending from the circumferential periphery thereof, said arm-like stubs extending into said cavities respectively.

* * * * *